(12) United States Patent
Zhang et al.

(10) Patent No.: US 12,500,434 B2
(45) Date of Patent: Dec. 16, 2025

(54) CHARGING MANAGEMENT SYSTEM FOR CHARGING DEVICE INCLUDING WIRELESS POWER SUPPLY MODULE CONFIGURED TO CONTROL LOGIC SWITCHING BETWEEN WIRED CHARGING AND WIRELESS CHARGING, AND CHARGING MANAGEMENT METHOD FOR SUCH SYSTEM

(71) Applicant: Chengdu Vantron Technology Co., Ltd., Sichuan (CN)

(72) Inventors: Kang Zhang, Sichuan (CN); Shun Zhang, Sichuan (CN); Bo Wei, Sichuan (CN)

(73) Assignee: Chengdu Vantron Technology Co., Ltd., Chengdu (CN)

( * ) Notice: Subject to any disclaimer, the term of this patent is extended or adjusted under 35 U.S.C. 154(b) by 628 days.

(21) Appl. No.: 17/956,826

(22) Filed: Sep. 30, 2022

(65) Prior Publication Data

US 2023/0318335 A1    Oct. 5, 2023

(30) Foreign Application Priority Data

Mar. 28, 2022   (CN) .......................... 202210308300.0

(51) Int. Cl.
*H01M 10/46* (2006.01)
*H02J 7/00* (2006.01)
*H02J 50/10* (2016.01)

(52) U.S. Cl.
CPC .......... *H02J 7/0063* (2013.01); *H02J 7/0071* (2020.01); *H02J 50/10* (2016.02)

(58) Field of Classification Search
CPC ...... H02J 7/0063; H02J 7/0071; H02J 7/0029; H02J 7/0047; H02J 7/00712; H02J 50/10
USPC ......................... 320/107, 108, 138, 161, 162
See application file for complete search history.

(56) References Cited

U.S. PATENT DOCUMENTS

2020/0119580 A1* 4/2020 Park ........................ H04L 27/12
2022/0385085 A1* 12/2022 Jeon ..................... H04R 1/1025

FOREIGN PATENT DOCUMENTS

CN    105529802 A     4/2016
KR    102647156 B1 *  3/2024

* cited by examiner

*Primary Examiner* — Edward Tso (57) ABSTRACT

The present disclosure provides a charging management system and for a charging device includes a wired power supply module, a wireless power supply module, a CPU, and a charging IC, where the charging management system further includes a first power supply detection circuit, a second power supply detection circuit, and an interlock circuit, the interlock circuit is configured to prevent damage to the system caused by power supply inter-charging between the wired charging and the wireless charging, and by detecting whether the wired charging is in place by the power supply detection circuit, designing logic of the wired charging and the wireless charging, the system is prevented from pumping a high power at a moment of charging of a device, and stable charging of the device can be ensured. In addition, the circuit is simple, costs are low, a design concept is clear.

8 Claims, 7 Drawing Sheets

CHARGING MANAGEMENT SYSTEM FOR CHARGING DEVICE INCLUDING WIRELESS POWER SUPPLY MODULE CONFIGURED TO CONTROL LOGIC SWITCHING BETWEEN WIRED CHARGING AND WIRELESS CHARGING, AND CHARGING MANAGEMENT METHOD FOR SUCH SYSTEM

CROSS REFERENCE TO RELATED APPLICATIONS

This application claims priority to Chinese Patent Application No. 202210308300.0 filed on Mar. 28, 2022, the disclosure of which is herein incorporated by reference in its entirety.

FIELD

The present disclosure relates to the field of electronic device technologies, and in particular, to a charging management system and method for a charging device.

BACKGROUND

Nowadays, mobile phones, tablets, and most electronic products have built-in batteries to facilitate recycling. Currently, a mainstream charging manner is wired charging, and in some markets, wireless charging is introduced to meet customer requirements. However, there are some problems in use: A system pumps a high current at a moment of charging, resulting in instability of charging and occurrence of repeated connection for charging and disconnection of power, especially at high power (a voltage is increased to 9 V/12 V to improve the power). The problems are less likely to occur at low power (charging at 5 V by default). The specific reasons are as follows: No matter in a tablet or a mobile phone, a built-in charging IC is provided, with the function of performing DCDC voltage drop on an input power supply to reach a voltage that can be received by a battery and system and controlling voltage and current limits of an input power supply, and some simple protection functions. The charging IC usually has configuration parameters by default (settings of input voltage and current limits and charging voltage and current). The default configurations generally require relatively high input power; moreover, a maximum power cannot be reached at the moment of connection during wireless charging, and it takes time to slowly increase the power, in which case the power of the wireless charging needs to be increased in order to enable the wireless charging to be stable.

The foregoing method is relatively suitable for an application scenario in which fixed power consumption is relatively low. However, when the method is used in a system such as a tablet or a mobile phone, defects occur: At a moment of charging, the system instantly pumps a high current due to certain actions of the system, resulting in disconnection of wireless charging due to insufficient power, which is continuously repeated in this manner, and to enable the wireless charging to reach high-power charging (which is 5 V charging by default, and the high power refers to increasing the voltage to 9 V/12 V), it takes time to buffer before a high voltage can be reached; and therefore, the power of the wireless charging may be increased, or the charging power is set very low at the beginning of the charging.

SUMMARY

An objective of the present disclosure is to provide a charging management system and method for a charging device, to overcome the shortcomings that the prior art is not suitable for use in a system such as a tablet or a mobile phone: at a moment of charging, the system instantly pumps a high current due to certain actions of the system, resulting in disconnection of wireless charging due to insufficient power, which is continuously repeated in this manner, and to enable the wireless charging to reach high-power charging, it takes time to buffer before a high voltage can be reached.

To achieve the foregoing disclosure objective, the present disclosure provides the following technical solutions.

A charging management system for a charging device includes a wired power supply module, a wireless power supply module, a CPU, and a charging IC, where the charging management system further includes a first power supply detection circuit, a second power supply detection circuit, and an interlock circuit;

the first power supply detection circuit and the second power supply detection circuit are electrically connected to the wired power supply module and the wireless power supply module respectively, and the first power supply detection circuit and the second power supply detection circuit are further electrically connected to the interlock circuit;

the interlock circuit is further electrically connected to the wired power supply module, the wireless power supply module, and the charging IC, and the wireless power supply module is configured to receive a wireless power supply and control logic switching between wired charging and wireless charging;

the first power supply detection circuit and the second power supply detection circuit are further electrically connected to the CPU, and are configured to detect whether the wired charging is in place, and upload detection information to the CPU;

the CPU is configured to automatically adjust wired charging parameters and wireless charging parameters based on the detection information;

the charging IC is configured to receive charging parameters of the CPU and perform charging based on the charging parameters.

In the foregoing technical solution, the interlock circuit is configured to prevent damage to the system caused by power supply inter-charging between the wired charging and the wireless charging, and by detecting whether the wired charging is in place by the power supply detection circuit, the input of the power supply can be ensured to be adjusted in time, a corresponding maximum current allowed to be inputted and a lowest voltage allowed to be inputted are adjusted, the system is prevented from pumping a high power at a moment of charging of a device, and stable charging of the device can be ensured.

Further, the charging management system further includes a lithium battery, a cathode of the lithium battery is electrically connected to a second interface of the charging IC, and an anode of the lithium battery is grounded.

In a preferred solution of the present disclosure, the wired charging parameters are a maximum current allowed to be inputted for the wired charging and a maximum current for charging a battery, which are set based on a battery capacity of the battery used during the wired charging, and the wireless charging parameters are a maximum current allowed to be inputted for the wireless charging and a maximum current for charging a battery, which are set based on a battery capacity of the battery used during the wireless charging.

Further, the wireless power supply module includes a wireless charging coil J1 and a wireless power supply receiving IC;
a first interface and a second interface of the wireless charging coil J1 are electrically connected to a corresponding first interface and second interface of the wireless power supply receiving IC respectively.

Further, the interlock circuit includes a PMOS transistor Q1, a PMOS transistor Q3, a resistor R2, and a resistor R5;
a gate of the PMOS transistor Q1 is electrically connected to a source of the PMOS transistor Q3 and a third interface of the wireless power supply receiving IC, a drain of the PMOS transistor Q1 and a gate of the PMOS transistor Q3 are electrically connected to a fourth interface of the wireless power supply receiving IC, a source of the PMOS transistor Q1 and a drain of the PMOS transistor Q3 are both electrically connected to a first interface of the charging IC, the gate of the PMOS transistor Q1 and the gate of the PMOS transistor Q3 are both grounded, the gate of the PMOS transistor Q3 is further electrically connected to the resistor R2, the gate of the PMOS transistor Q1 is further electrically connected to the resistor R5, and the resistor R2 and the resistor R5 are both grounded.

Furthermore, the wired power supply module is a wired charging connector J2;
a first interface of the wired charging connector J2 is electrically connected to the drain of the PMOS transistor Q1, and a second interface of the wired charging connector J2 is grounded.

Further, the first power supply detection circuit includes a NMOS transistor Q2, a resistor R1, a resistor R3, and a resistor R4; the second power supply detection circuit includes a NMOS transistor Q4, a resistor R6, a resistor R7, and a resistor R8;
one end of the resistor R3 and one end of the resistor R4 are electrically connected to a gate of the NMOS transistor Q2, the other end of the resistor R3 is electrically connected to the fourth interface of the wireless power supply receiving IC, one end of the resistor R7 and one end of the resistor R8 are electrically connected to a gate of the NMOS transistor Q4, the other end of the resistor R7 is electrically connected to the first interface of the wired charging connector J2, the other end of the resistor R4 and the other end of the resistor R8 are both grounded, the resistor R1 and the resistor R6 are electrically connected to a drain of the NMOS transistor Q2 and a drain of the NMOS transistor Q4 respectively, and a source of the NMOS transistor Q2 and a source of the NMOS transistor Q4 are both grounded.

In the foregoing technical solution, the circuit is simple, costs are low, a design concept is clear, and the charging management system is safe and reliable in use.

According to another aspect, further provided is a charging management method for any one of the foregoing charging management systems for a charging device, including the following steps:
S1: setting priorities for the two types of charging, where the wired charging takes precedence over the wireless charging;
S2: when the fourth interface of the wireless power supply receiving IC and the first power supply detection circuit detect that the wired charging is in place, disconnecting the wireless power supply module, disconnecting the third interface of the wireless power supply receiving IC, switching to the wired charging, and setting, by the CPU, the wired charging parameters based on the battery capacity of the battery used; and
S3: when it is detected that the wired charging is not in place, connecting the third interface of the wireless power supply receiving IC, performing detection and uploading detection information to the CPU by the second power supply detection circuit, and switching a path of the wireless power supply module to the wireless charging, where the CPU sets two sets of wireless charging parameters, and the wireless charging parameters are set as follows: when the wireless charging is connected, the wireless charging parameters are set as low-power parameters and a delay time is set; and when the delay ends, the wireless charging parameters are set based on power of wireless power supplying and the battery capacity of the battery used.

In the foregoing technical solution, by designing logic of the wired charging and the wireless charging and setting the charging priorities, the input of the power supply is adjusted in time, and a corresponding maximum current allowed to be inputted and a lowest voltage allowed to be inputted are adjusted, so that the system is prevented from pumping a high power at a moment of charging of a device, and stable charging of the device can be ensured.

Further, the delay time is set by measuring a time for which the wireless charging reaches a maximum power output.

Compared with the prior art, the present disclosure has the following beneficial effects:

The interlock circuit is configured to prevent damage to the system caused by power supply inter-charging between the wired charging and the wireless charging, and by detecting whether the wired charging is in place by the power supply detection circuit, designing logic of the wired charging and the wireless charging, and setting the charging priorities, the input of the power supply can be ensured to be adjusted in time, a corresponding maximum current allowed to be inputted and a lowest voltage allowed to be inputted are adjusted, the system is prevented from pumping a high power at a moment of charging of a device, and stable charging of the device can be ensured. In addition, the circuit is simple, costs are low, a design concept is clear, and the charging management system is safe and reliable in use.

DETAILED DESCRIPTION

The present disclosure is further described in detail below with reference to embodiments and specific implementations. However, it should not be understood that the scope of the foregoing subject matter of the present disclosure is limited to only the following embodiments, and all technologies implemented based on the content of the present disclosure fall within the scope of the present disclosure.

Embodiment 1

Figure 1:
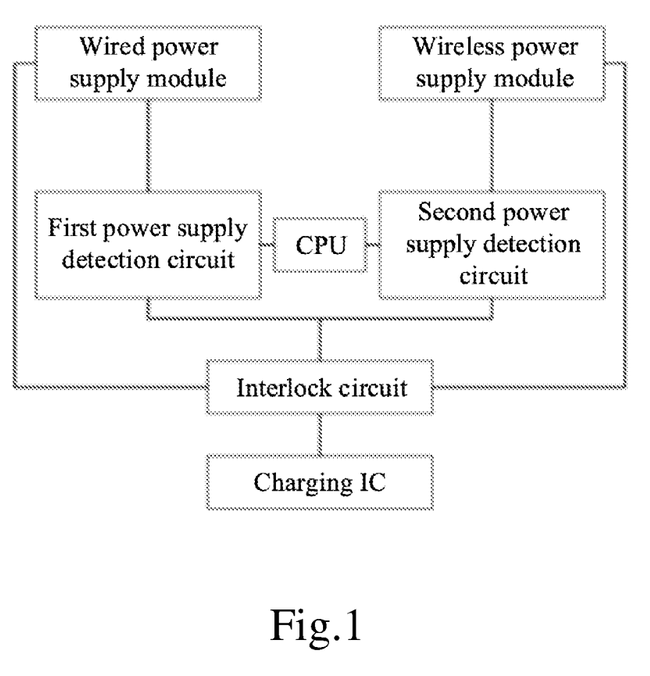
FIG. 1 is a structural block diagram of a charging management system for a charging device according to Embodiment 1 of the present disclosure.

A charging management system for a charging device, as shown in FIG. 1, includes a wired power supply module, a wireless power supply module, a CPU, a charging IC, a first power supply detection circuit, a second power supply detection circuit, and an interlock circuit;
  the first power supply detection circuit and the second power supply detection circuit are electrically connected to the wired power supply module and the wireless power supply module respectively, and the first power supply detection circuit and the second power supply detection circuit are further electrically connected to the interlock circuit;
  the interlock circuit is further electrically connected to the wired power supply module, the wireless power supply module, and the charging IC, and the wireless power supply module is configured to receive a wireless power supply and control logic switching between wired charging and wireless charging;
  the first power supply detection circuit and the second power supply detection circuit are further electrically connected to the CPU, and are configured to detect whether the wired charging is in place, and upload detection information to the CPU;
  the CPU is configured to automatically adjust wired charging parameters and wireless charging parameters based on the detection information;
  the charging IC is configured to receive charging parameters of the CPU and perform charging based on the charging parameters.

Figure 2:
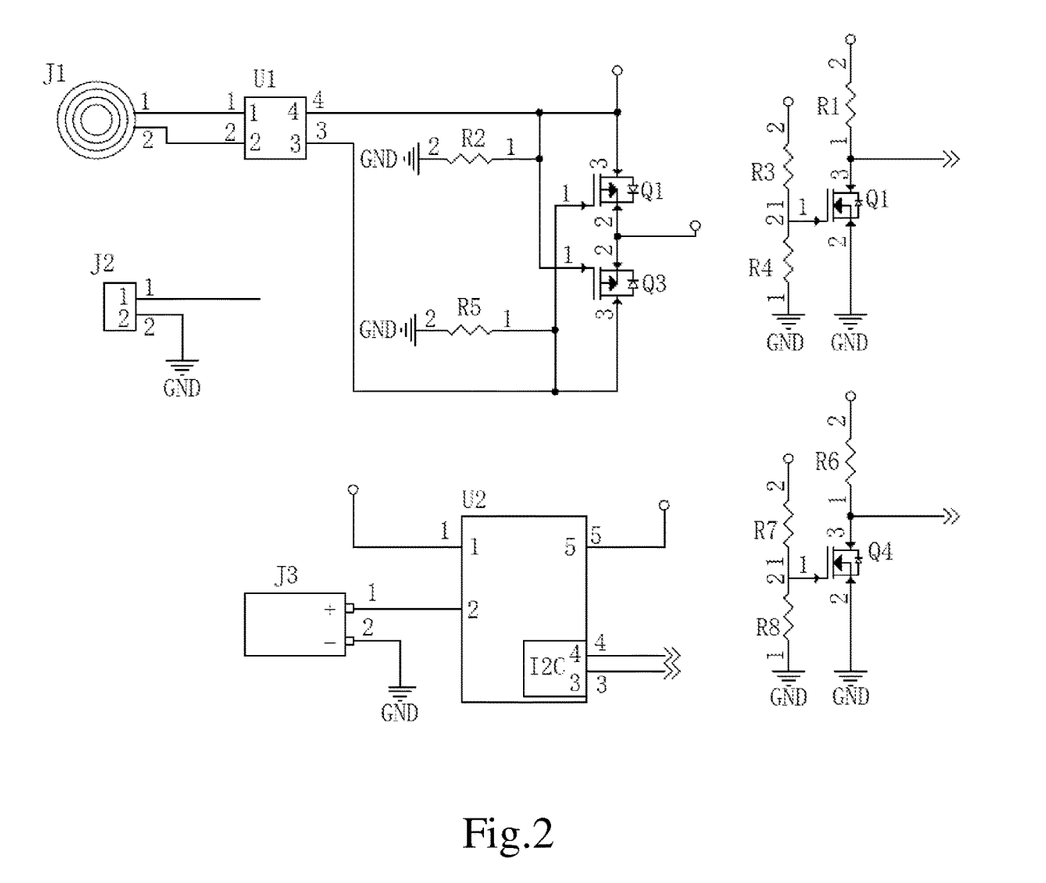
FIG. 2 is a diagram illustrating a principle of the charging management system for a charging device according to Embodiment 1 of the present disclosure.

As shown in FIG. 2, the charging management system further includes a lithium battery, a cathode of the lithium battery is electrically connected to a second interface of the charging IC, and an anode of the lithium battery is grounded.

The wired charging parameters are a maximum current allowed to be inputted for the wired charging and a maximum current for charging a battery, which are set based on a battery capacity of the battery used during the wired charging, and the wireless charging parameters are a maximum current allowed to be inputted for the wireless charging and a maximum current for charging a battery, which are set based on a battery capacity of the battery used during the wireless charging.

As shown in FIG. 2, the wireless power supply module includes a wireless charging coil J1 and a wireless power supply receiving IC;
  a first interface and a second interface of the wireless charging coil J1 are electrically connected to a corresponding first interface and second interface of the wireless power supply receiving IC respectively.

Figure 3:
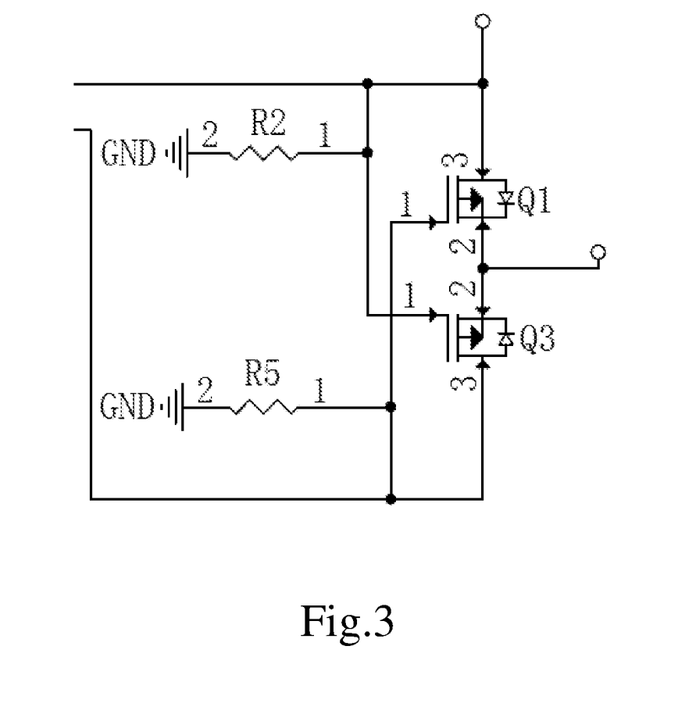
FIG. 3 is a diagram illustrating a principle of an interlock circuit of the charging management system for a charging device according to Embodiment 1 of the present disclosure.

As shown in FIG. 3, the interlock circuit includes a PMOS transistor Q1, a PMOS transistor Q3, a resistor R2, and a resistor R5;
  a gate of the PMOS transistor Q1 is electrically connected to a source of the PMOS transistor Q3 and a third interface of the wireless power supply receiving IC, a drain of the PMOS transistor Q1 and a gate of the PMOS transistor Q3 are electrically connected to a fourth interface of the wireless power supply receiving IC, a source of the PMOS transistor Q1 and a drain of the PMOS transistor Q3 are both electrically connected to a first interface of the charging IC, the gate of the PMOS transistor Q1 and the gate of the PMOS transistor Q3 are both grounded, the gate of the PMOS transistor Q3 is further electrically connected to the resistor R2, the gate of the PMOS transistor Q1 is further electrically connected to the resistor R5, and the resistor R2 and the resistor R5 are both grounded.

As shown in FIG. 2, the wired power supply module is a wired charging connector J2;
  a first interface of the wired charging connector J2 is electrically connected to the drain of the PMOS transistor Q1, and a second interface of the wired charging connector J2 is grounded.

Figure 4:
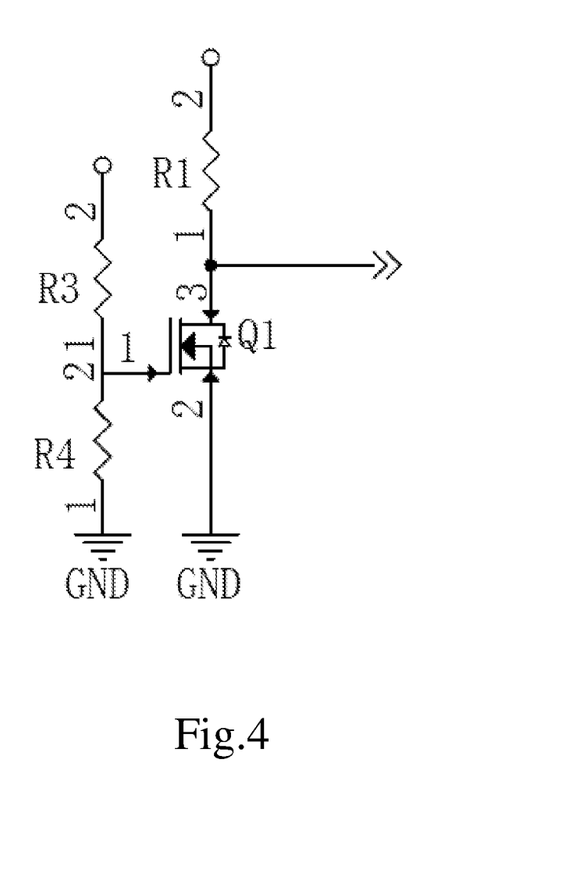
FIG. 4 is a diagram illustrating a principle of a first power supply detection circuit of the charging management system for a charging device according to Embodiment 1 of the present disclosure.
Figure 5:
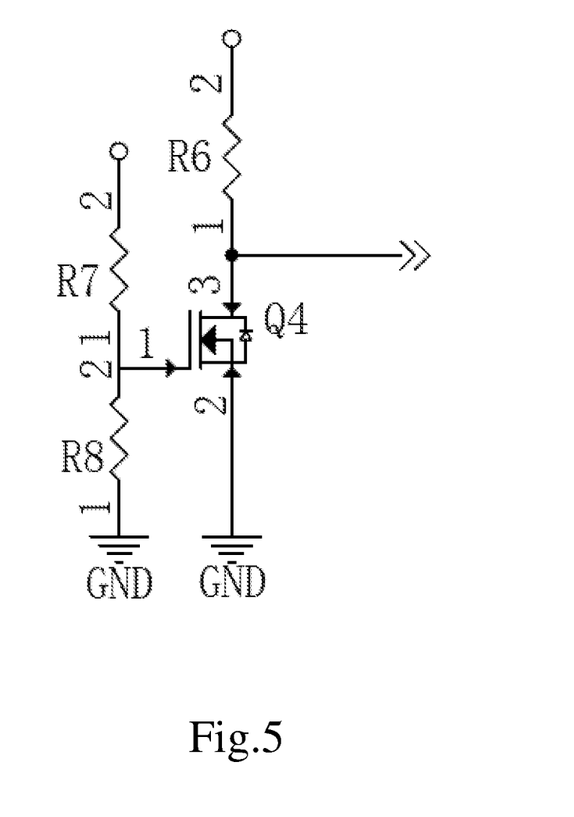
FIG. 5 is a diagram illustrating a principle of a second power supply detection circuit of the charging management system for a charging device according to Embodiment 1 of the present disclosure.

As shown in FIG. 4, the first power supply detection circuit includes a NMOS transistor Q2, a resistor R1, a resistor R3, and a resistor R4. As shown in FIG. 5, the second power supply detection circuit includes a NMOS transistor Q4, a resistor R6, a resistor R7, and a resistor R8;
  one end of the resistor R3 and one end of the resistor R4 are electrically connected to a gate of the NMOS transistor Q2, the other end of the resistor R3 is electrically connected to the fourth interface of the wireless power supply receiving IC, one end of the resistor R7 and one end of the resistor R8 are electrically connected to a gate of the NMOS transistor Q4, the other end of the resistor R7 is electrically connected to the first interface of the wired charging connector J2, the other end of the resistor R4 and the other end of the resistor R8 are both grounded, the resistor R1 and the resistor R6 are electrically connected to a drain of the NMOS transistor Q2 and a drain of the NMOS transistor Q4 respectively, and a source of the NMOS transistor Q2 and a source of the NMOS transistor Q4 are both grounded.

Specifically, the wireless power supply receiving IC controls the logic switching between the wired charging and the wireless charging; when the first power supply detection circuit and the fourth interface of the wireless power supply receiving IC detect that VBUS_USBI has an input, that is, when a wired power supply exists, a wireless charging output of the third interface of the wireless power supply receiving IC is turned off; or otherwise, a fourth interface of the wireless power supply is turned on, and a wireless charging output is turned on.

In the foregoing technical solution, the interlock circuit is configured to prevent damage to the system caused by power supply inter-charging between the wired charging and the wireless charging, and by detecting whether the wired charging is in place by the power supply detection circuit, the input of the power supply can be ensured to be adjusted in time, a corresponding maximum current allowed to be inputted and a lowest voltage allowed to be inputted are adjusted, the system is prevented from pumping a high power at a moment of charging of a device, and stable charging of the device can be ensured. The circuit is simple, costs are low, a design concept is clear, and the charging management system is safe and reliable in use.

Embodiment 2

Figure 6:
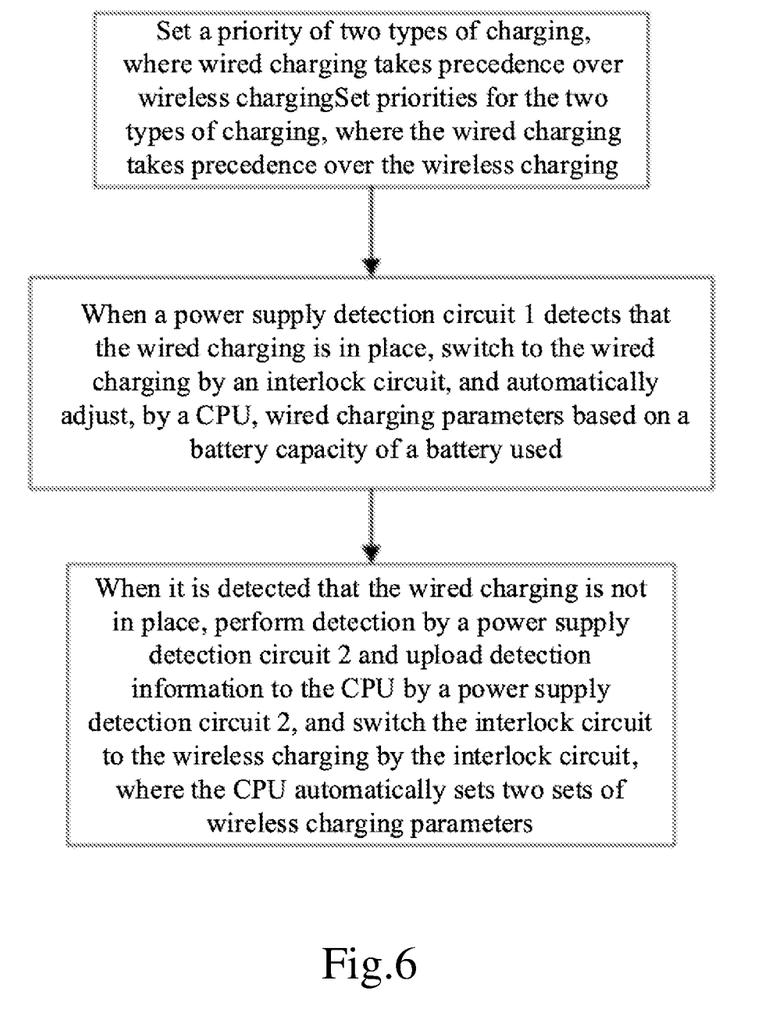
FIG. 6 is a logic flowchart of a charging management method for a charging device according to Embodiment 2 of the present disclosure.

A charging management method for the charging management system for a charging device according to Embodiment 1, as shown in FIG. 6, includes the following steps.

S1: Set priorities for the two types of charging, where the wired charging takes precedence over the wireless charging.

S2: When the interface 4 of the wireless power supply receiving IC and the first power supply detection circuit detect that the wired charging is in place, disconnect the wireless power supply module, disconnect the interface 3 of the wireless power supply receiving IC, switch to the wired charging, and set, by the CPU, the wired charging parameters based on the battery capacity of the battery used.

S3: When it is detected that the wired charging is not in place, connect the interface 3 of the wireless power supply receiving IC, perform detection and upload detection information to the CPU by the second power supply detection circuit, and switch a path of the wireless power supply module to the wireless charging, where the CPU sets two sets of wireless charging parameters, and the wireless charging parameters are set as follows: When the wireless charging is connected, the wireless charging parameters are set as low-power parameters and a delay time is set; and when the delay ends, the wireless charging parameters are set based on power of wireless power supplying and the battery capacity of the battery used.

The delay time is set by measuring a time for which the wireless charging reaches a maximum power output.

Figure 7:
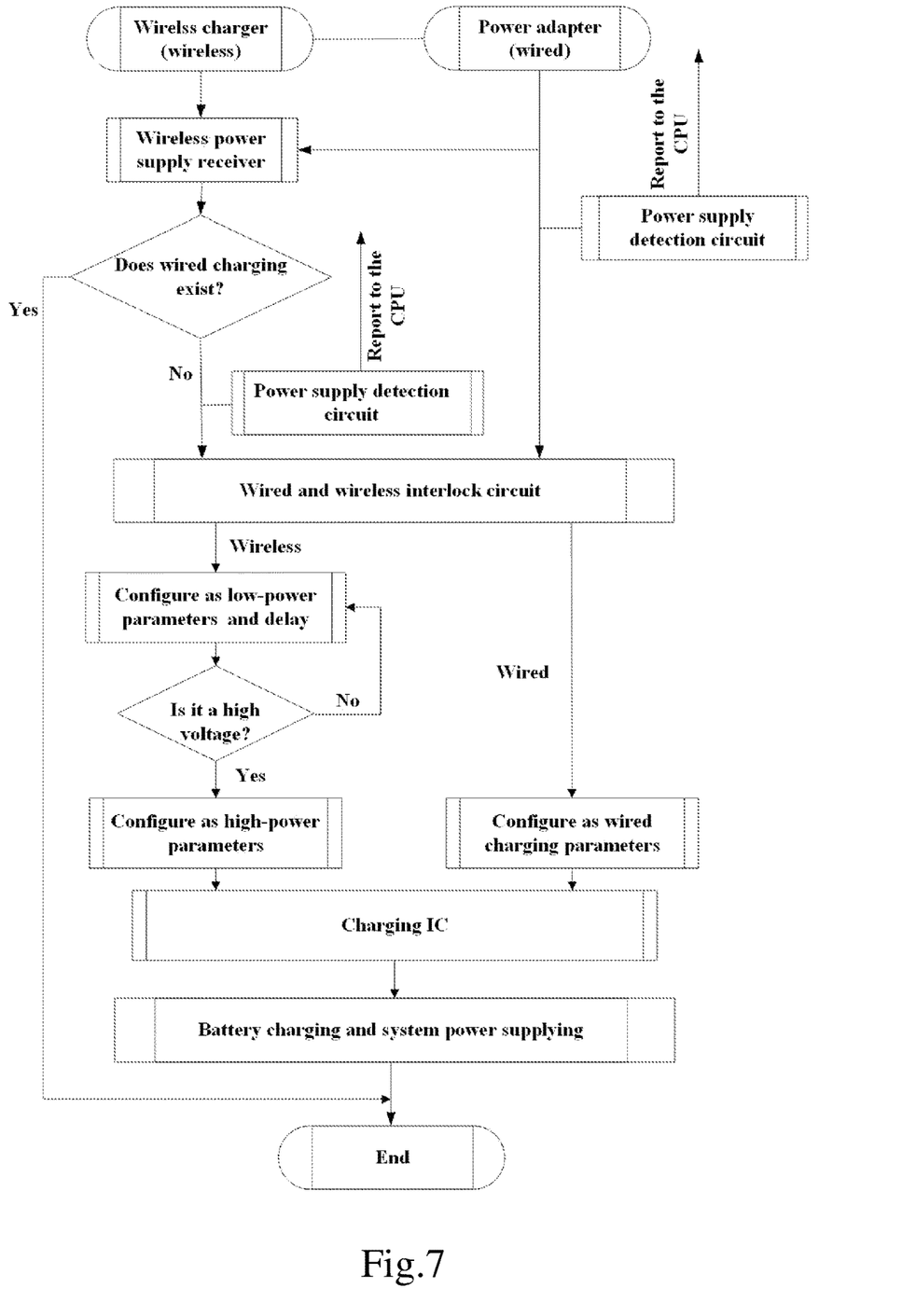
FIG. 7 is a flowchart of the charging management method for a charging device according to Embodiment 2 of the present disclosure.

Specifically, as shown in FIG. 7, the power supply detection circuit and the interface 4 of the wireless power supply receiving IC detect whether wired charging of the wired power supply module is in place, and upload detection information to the CPU; if the wired charging is in place, the current is automatically adjusted to the maximum current allowed to be inputted for a battery used and a maximum current for charging the battery, to be used for charging; after the detection circuit detects that the wired charging is not in place, the second power supply detection circuit performs detection and uploads detection information to the CPU, and a path of the wireless power supply module is switched to wireless charging. After the CPU receives the detection information, the CPU automatically adjusts the charging parameter to a low voltage of 5 V for charging and sets a delay time. After the delay time expires, the current is again automatically adjusted to the maximum current allowed to be inputted for the battery used and the maximum current for charging the battery, to be used for charging.

In the foregoing technical solution, by designing logic of the wired charging and the wireless charging and setting the charging priorities, the input of the power supply is adjusted in time, and a corresponding maximum current allowed to be inputted and a lowest voltage allowed to be inputted are adjusted, so that the system is prevented from pumping a high power at a moment of charging of a device, and stable charging of the device can be ensured.

The above are merely preferred embodiments of the present invention, but are not intended to limit the present invention, and any modifications, equivalent replacements, improvements, and the like made within the spirit and principles of the present invention should fall within the protection scope of the present invention.

What is claimed is:

1. A charging management system for a charging device, comprising a wired power supply module, a wireless power supply module, a CPU, a charging IC, a first power supply detection circuit, a second power supply detection circuit, and an interlock circuit; wherein the first power supply detection circuit and the second power supply detection circuit are electrically connected to the wired power supply module and the wireless power supply module respectively, and the first power supply detection circuit and the second power supply detection circuit are further electrically connected to the interlock circuit;

the interlock circuit is further electrically connected to the wired power supply module, the wireless power supply module, and the charging IC, and the wireless power supply module is configured to receive a wireless power supply and control logic switching between wired charging and wireless charging;

the first power supply detection circuit and the second power supply detection circuit are further electrically connected to the CPU, and are configured to detect whether the wired charging is in place, and upload detection information to the CPU;

the CPU is configured to automatically adjust wired charging parameters and wireless charging parameters based on the detection information;

the charging IC is configured to receive wired charging parameters and wireless charging parameters of the CPU and perform charging based on the wired charging parameters and the wireless charging parameters;

the wireless power supply module comprises a wireless charging coil J1 and a wireless power supply receiving IC;

a first interface and a second interface of the wireless charging coil J1 are electrically connected to a corresponding first interface and second interface of the wireless power supply receiving IC respectively;

the interlock circuit comprises a PMOS transistor Q1, a PMOS transistor Q3, a resistor R2, and a resistor R5;

a gate of the PMOS transistor Q1 is electrically connected to a drain of the PMOS transistor Q3 and a third interface of the wireless power supply receiving IC, a drain of the PMOS transistor Q1 and a gate of the PMOS transistor Q3 are electrically connected to a fourth interface of the wireless power supply receiving IC, a source of the PMOS transistor Q1 and a source of the PMOS transistor Q3 are both electrically connected to a first interface of the charging IC, the gate of the PMOS transistor Q3 is further electrically connected to the resistor R2, the gate of the PMOS transistor Q1 is further electrically connected to the resistor R5, and the resistor R2 and the resistor R5 are both grounded;

the wired power supply module is a wired charging connector J2;

a first interface of the wired charging connector J2 is electrically connected to the drain of the PMOS transistor Q1, and a second interface of the wired charging connector J2 is grounded; and the wireless power supply receiving IC controls the logic switching between the wired charging and the wireless charging; when the first power supply detection circuit and the fourth interface of the wireless power supply receiving IC detect that VBUS_USBI has an input, that is, when a wired power supply exists, a wireless charging output of the third interface of the wireless power supply receiving IC is turned off; or otherwise, a fourth interface of the wireless power supply is turned on, and a wireless charging output is turned on.

2. The charging management system for a charging device according to claim 1, wherein the charging management system further comprises a lithium battery, a cathode of the lithium battery is electrically connected to a second interface of the charging IC, and an anode of the lithium battery is grounded.

3. The charging management system for a charging device according to claim 1, wherein the wired charging parameters are a maximum current allowed to be inputted for the wired charging and a maximum current for charging a battery, which are set based on a battery capacity of the battery used during the wired charging, and the wireless charging parameters are a maximum current allowed to be inputted for the wireless charging and a maximum current for charging a battery, which are set based on a battery capacity of the battery used during the wireless charging.

4. The charging management system for a charging device according to claim 1, wherein the first power supply detection circuit comprises an NMOS transistor Q2, a resistor R1, a resistor R3, and a resistor R4; the second power supply detection circuit comprises an NMOS transistor Q4, a resistor R6, a resistor R7, and a resistor R8; and one end of the resistor R3 and one end of the resistor R4 are electrically connected to a gate of the NMOS transistor Q2, the other end of the resistor R3 is electrically connected to the fourth interface of the wireless power supply receiving IC, one end of the resistor R7 and one end of the resistor R8 are electrically connected to a gate of the NMOS transistor Q4, the other end of the resistor R7 is electrically connected to the first interface of the wired charging connector J2, the other end of the resistor R4 and the other end of the resistor R8 are both grounded, the resistor R1 and the resistor R6 are electrically connected to a drain of the NMOS transistor Q2 and a drain of the NMOS transistor Q4 respectively, and a source of the NMOS transistor Q2 and a source of the NMOS transistor Q4 are both grounded.

5. A charging management method for the charging management system for a charging device according to claim 1, comprising the following steps:
   S1: setting priorities for the two types of charging, wherein the wired charging takes precedence over the wireless charging;
   S2: when the fourth interface of the wireless power supply receiving IC and the first power supply detection circuit detect that the wired charging is in place, disconnecting the wireless power supply module, disconnecting the third interface of the wireless power supply receiving IC, switching to the wired charging, and setting, by the CPU, the wired charging parameters based on the battery capacity of the battery used; and
   S3: when it is detected that the wired charging is not in place, connecting the third interface of the wireless power supply receiving IC, performing detection and uploading detection information to the CPU by the second power supply detection circuit, and switching a path of the wireless power supply module to the wireless charging, wherein the CPU sets two sets of wireless charging parameters, and the wireless charging parameters are set as follows: when the wireless charging is connected, the wireless charging parameters are set as low-power parameters and a delay time is set; and when the delay ends, the wireless charging parameters are set based on power of wireless power supplying and the battery capacity of the battery used.

6. The charging management method for the charging management system for a charging device according to claim 5, wherein the delay time is set by measuring a time for which the wireless charging reaches a maximum power output.

7. A charging management method for the charging management system for a charging device according to claim 3, comprising the following steps:
   S1: setting priorities for the two types of charging, wherein the wired charging takes precedence over the wireless charging;
   S2: when the fourth interface of the wireless power supply receiving IC and the first power supply detection circuit detect that the wired charging is in place, disconnecting the wireless power supply module, disconnecting the third interface of the wireless power supply receiving IC, switching to the wired charging, and setting, by the CPU, the wired charging parameters based on the battery capacity of the battery used;
   S3: when it is detected that the wired charging is not in place, connecting the third interface of the wireless power supply receiving IC, performing detection and uploading detection information to the CPU by the second power supply detection circuit, and switching a path of the wireless power supply module to the wireless charging, wherein the CPU sets two sets of wireless charging parameters, and the wireless charging parameters are set as follows: when the wireless charging is connected, the wireless charging parameters are set as low-power parameters and a delay time is set; and when the delay ends, the wireless charging parameters are set based on power of wireless power supplying and the battery capacity of the battery used.

8. The charging management method for the charging management system for a charging device according to claim 7, wherein the delay time is set by measuring a time for which the wireless charging reaches a maximum power output.

* * * * *